July 5, 1927.

L. C. BROWNING 1,634,395

TRAFFIC SIGNAL

Filed Oct. 18, 1926

L. C. Browning
INVENTOR

BY Victor J. Evans
ATTORNEY

WITNESS:

July 5, 1927. 1,634,395
L. C. BROWNING
TRAFFIC SIGNAL
Filed Oct. 18, 1926 2 Sheets-Sheet 2
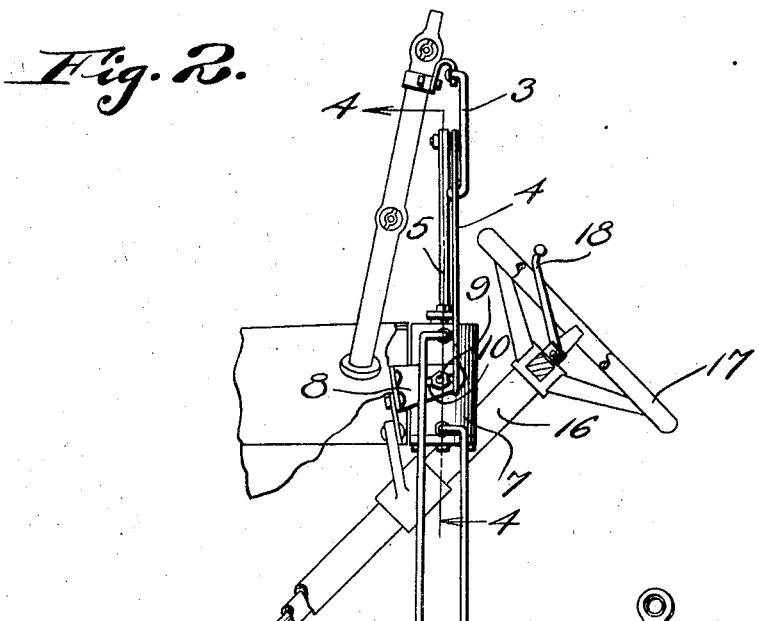
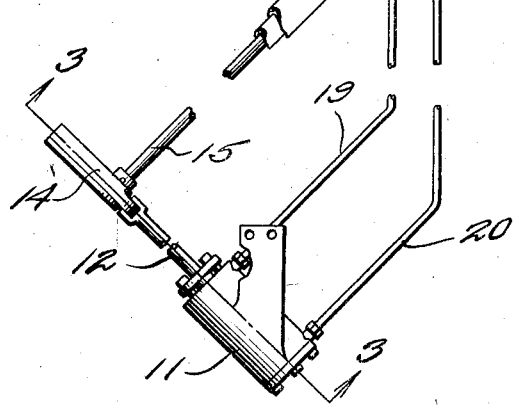
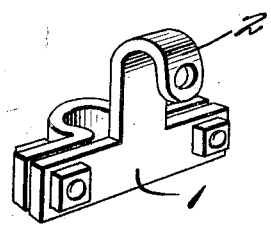
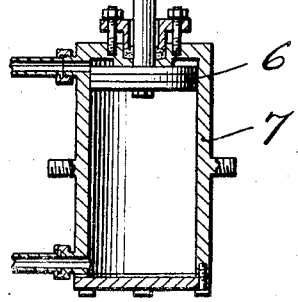
L.C.Browning
INVENTOR
BY Victor J. Evans
ATTORNEY
WITNESS:

Patented July 5, 1927.

1,634,395

UNITED STATES PATENT OFFICE.

LOWELL C. BROWNING, OF LONG BEACH, CALIFORNIA.

TRAFFIC SIGNAL.

Application filed October 18, 1926. Serial No. 142,397.

This invention relates to a signal for motor vehicles and the like, the general object of the invention being to provide a signal arm with hydraulic means for operating the same, the hydraulic means being actuated by a handle preferably located on the steering wheel of the vehicle.

Another object of the invention is to support the signal arm by a pivoted hanger so that the arm will readily move to its signalling position and with but little effort on the part of the operating means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a side view of Figure 1, this view also showing the lower cylinder and the cam for operating the piston thereof.

Figure 4 is a section on line 4—4 of Figure 2.

Figure 5 is a view of the bracket for supporting the pivoted hanger.

Figures 1, 3:
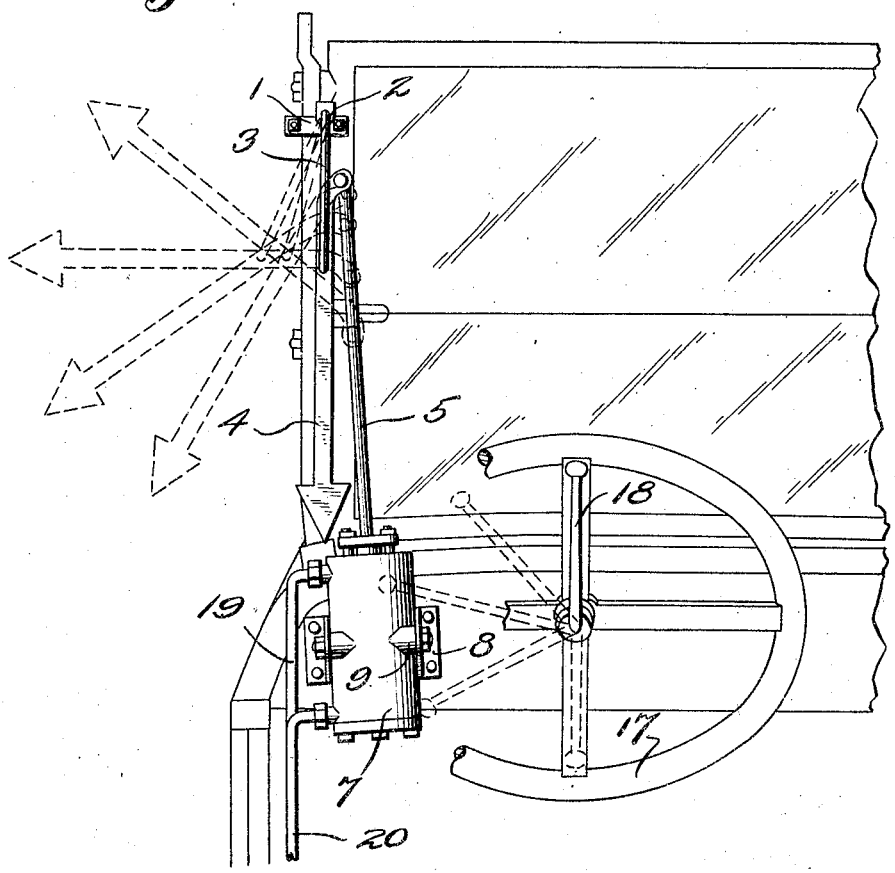
Figure 1 is a fragmentary view of portion of an automobile, showing the invention applied thereto.
Figure 3 is a section on line 3—3 of Figure 2.

In these views, 1 indicates a bracket which is clamped to a part of the windshield frame of a vehicle and which is formed with a perforated hook 2 to pivotally support a hanger or rod 3 which has its bent upper end engaging the perforation in the said hook 2. The signal arm 4 is made in the form of an arrow and it is pivotally connected with the lower bent end of the rod 3 adjacent its inner end, the said inner end being curved and pivoted to the upper end of a piston rod 5 of the piston 6 which is arranged in a cylinder 7 which is supported for rocking movement on the brackets 8 which are fastened to the dash or instrument board of the vehicle. The trunnions 9 are adjustably arranged in the slots 10 formed in the brackets so that the piston can be adjusted to suit different makes of cars or vehicles. A second cylinder 11 is suitably supported in the lower part of the vehicle and the rod 12 of the piston 13 of the said cylinder engages a cam or eccentric 14 secured to a shaft 15 which passes through the steering column 16 of the vehicle and through the hub of the steering wheel 17, where it is connected with a handle 18. A pipe 19 connects one end of the cylinder 11 with the upper end of the cylinder 7 and a second pipe 20 connects the other end of the cylinder 11 with the lower end of the cylinder 7.

It will thus be seen that when the shaft 15 is turned by its handle 18, the eccentric 14 will operate the piston 13 in the cylinder 11 so that some of the fluid in the said cylinder will pass to the cylinder 7 and thus lower the piston 6 in the said cylinder 7 to cause the rod 5 to pull downwardly upon the inner end of the arm 4 and thus cause the arm to swing outwardly from the vehicle, where it can be seen by persons near the vehicle. It will be understood that the extent of movement of the arm will depend upon the amount of movement of the handle 18 so that the driver can move the arm 4 to any desired position. The uppermost limit of movement of the arm might indicate that the vehicle is to be turned to the right, a horizontal position might indicate that the vehicle is to turn to the left, while another position might indicate that the vehicle is to be stopped.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A signal for a vehicle comprising a hanger pivotally connected with a part of the vehicle, a signal arm pivotally connected with the lower end of the hanger adjacent the inner end of the arm and means connected with the inner end of the arm for moving the arm upwardly from a vertical depending position.

2. A signal for a vehicle comprising a hanger pivotally connected with a part of the vehicle, a signal arm pivotally connected with the lower end of the hanger adjacent the inner end of the arm, a rod connected with the inner end of the arm, a cylinder supported by the vehicle, a piston in the cylinder and connected with the rod, a second cylinder, pipes connecting the ends of the same with the ends of the first cylinder, a piston in the second cylinder and manually operated means for operating the piston of the second cylinder for forcing fluid therein into the first cylinder to operate the piston therein.

3. A signal for a vehicle comprising a hanger pivotally connected with a part of the vehicle, a signal arm pivotally connected with the lower end of the hanger adjacent the inner end of the arm, a rod connected with the inner end of the arm, a cylinder supported by the vehicle, a piston in the cylinder and connected with the rod, a second cylinder, pipes connecting the ends of the same with the ends of the first cylinder, a piston in the second cylinder, manually operated means for operating the piston of the second cylinder for forcing fluid therein into the first cylinder to operate the piston therein, such means comprising an eccentric connected with the piston rod of the second cylinder, a shaft connected with the eccentric and a handle on the shaft for turning the same.

4. A signal for a vehicle comprising a hanger pivotally connected with a part of the vehicle, a signal arm pivotally connected with the lower end of the hanger adjacent the inner end of the arm, a rod connected with the inner end of the arm, a cylinder supported by the vehicle, a piston in the cylinder and connected with the rod, a second cylinder, pipes connecting the ends of the same with the ends of the first cylinder, a piston in the second cylinder, manually operated means for operating the piston of the second cylinder for forcing fluid therein into the first cylinder to operate the piston therein, such means comprising an eccentric connected with the piston rod of the second cylinder, a shaft connected with the eccentric, a handle on the shaft for turning the same and means for supporting the first cylinder so that it will have rocking movement.

In testimony whereof I affix my signature.

LOWELL C. BROWNING.